No. 749,743. PATENTED JAN. 19, 1904.
T. H. McQUOWN.
SPEED INDICATOR.
APPLICATION FILED SEPT. 26, 1902.
NO MODEL. 3 SHEETS—SHEET 1.
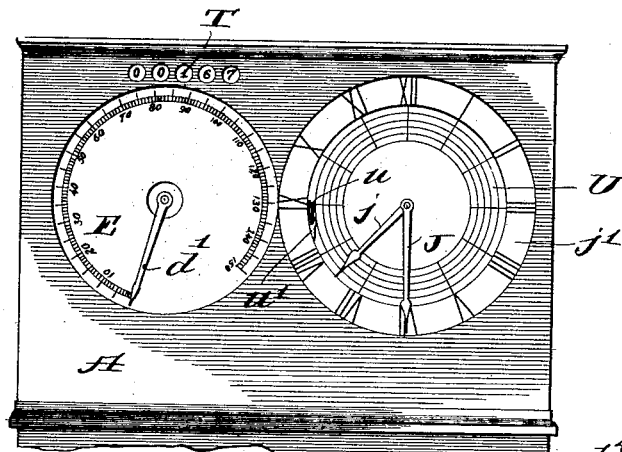
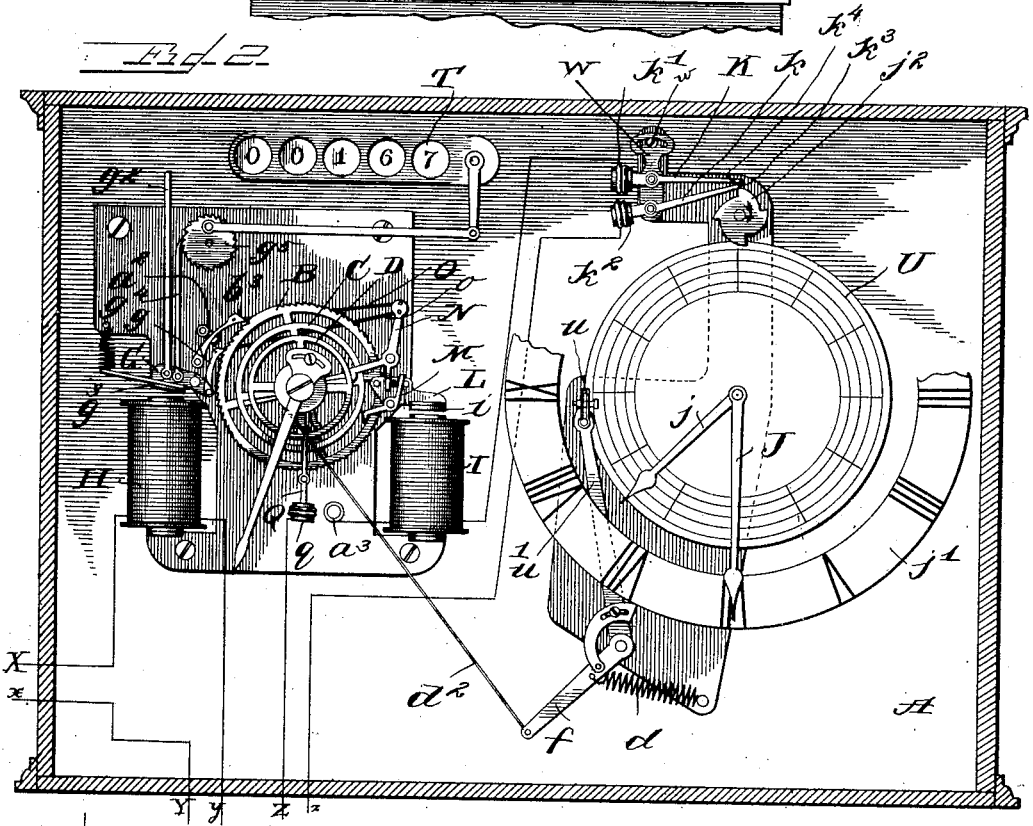
Witnesses: Inventor:
Thomas H. McQuown
by Cyrus W. Rice
Atty No. 749,743. PATENTED JAN. 19, 1904.
T. H. McQUOWN.
SPEED INDICATOR.
APPLICATION FILED SEPT. 26, 1902.
NO MODEL. 3 SHEETS—SHEET 2.
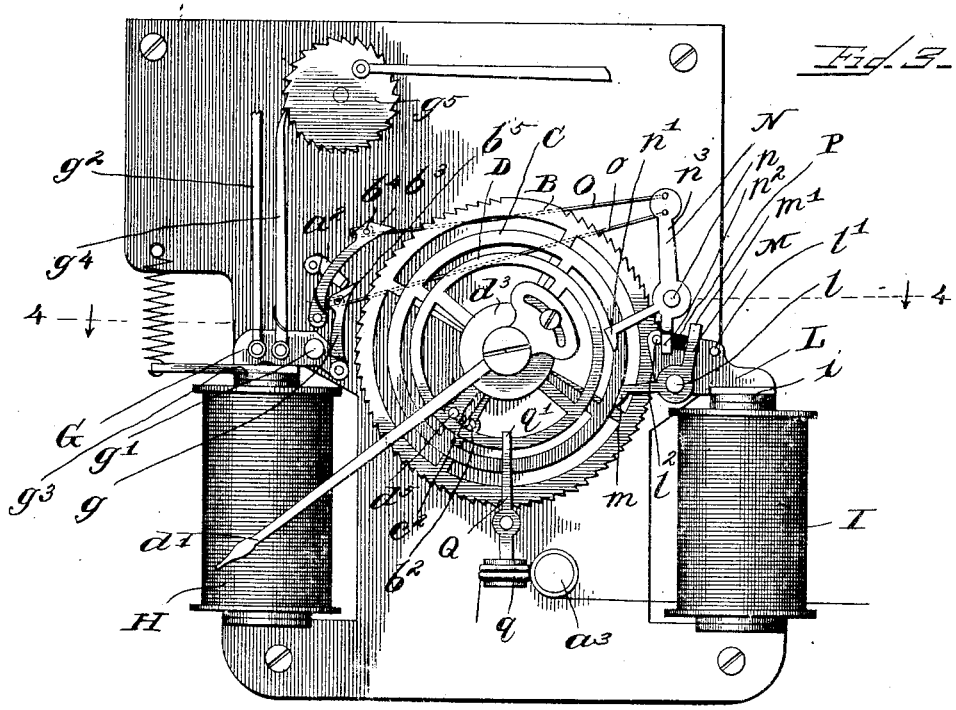
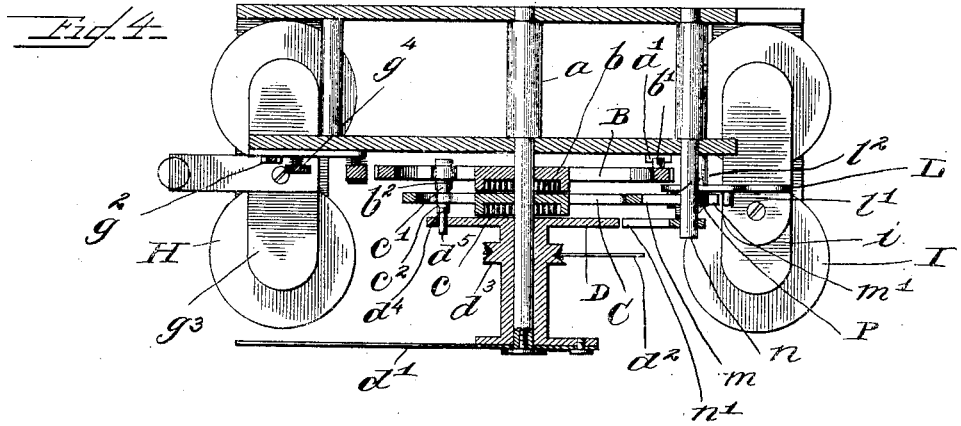
Witnesses:
Inventor:
Thomas H. McQuown
by Cyrus W. Rice
Atty.

No. 749,743. PATENTED JAN. 19, 1904.
T. H. McQUOWN.
SPEED INDICATOR.
APPLICATION FILED SEPT. 26, 1902.
NO MODEL. 3 SHEETS—SHEET 3.
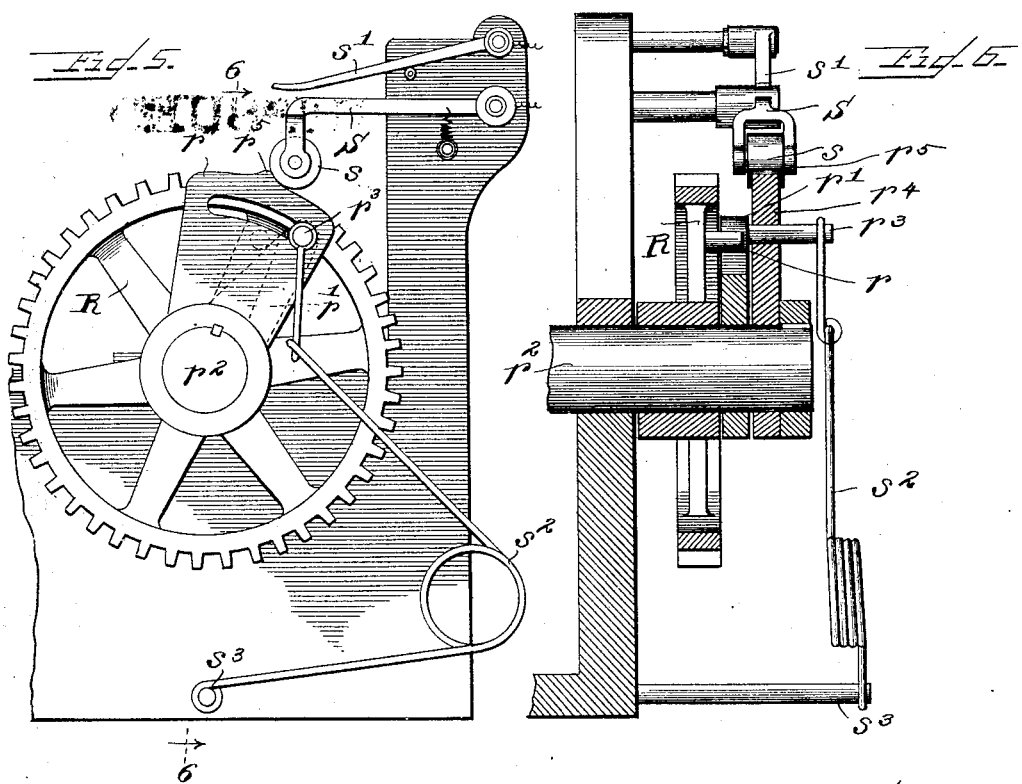
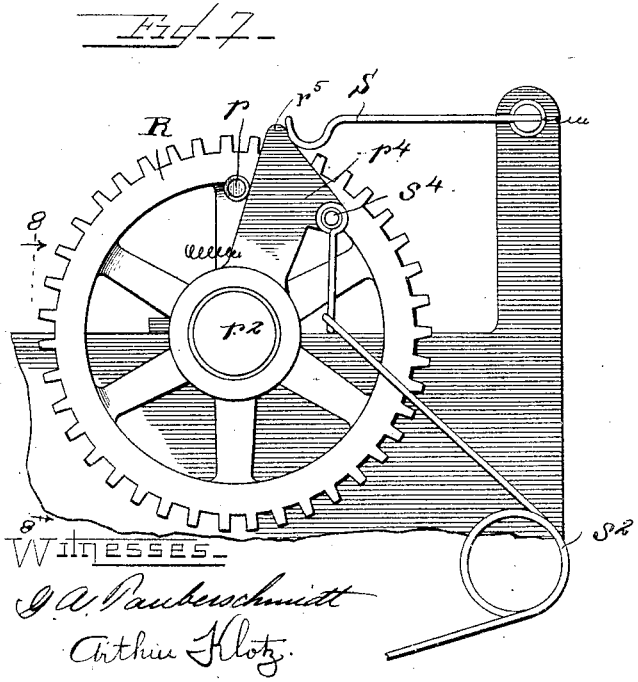
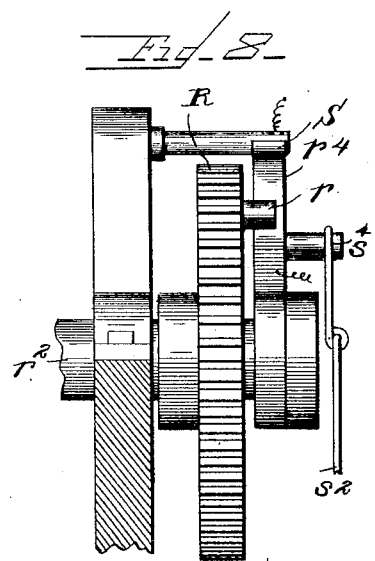
Witnesses
J. A. Taubenschmidt
Arthur Klotz
Inventor
Thomas H. McQuown
by Cyrus W. Rice
Atty.

No. 749,743. Patented January 19, 1904.

UNITED STATES PATENT OFFICE.

THOMAS H. McQUOWN, OF BIGGSVILLE, ILLINOIS.

SPEED-INDICATOR.

SPECIFICATION forming part of Letters Patent No. 749,743, dated January 19, 1904.

Application filed September 26, 1902. Serial No. 124,910. (No model.)

*To all whom it may concern:*

Be it known that I, THOMAS H. McQUOWN, a citizen of the United States, and a resident of Biggsville, in the county of Henderson and State of Illinois, have invented certain new and useful Improvements in Speed-Indicators, of which the following is such a full, clear, and exact description as will enable others skilled in the art to which it pertains to make and use the same, reference being had to the accompanying drawings, in which the same or similar parts are indicated in all the views by the same characters and which form a part of this specification.

The object of my invention is to provide, first, a new and improved speed-indicator devised to accurately show at a glance the speed of a locomotive, car, motor, vehicle, marine vessel, engine, or other machine to which the indicator is applied, the speed being indicated either by the number of miles traveled in a given time by the vehicle or vessel or by the number of revolutions in a given time of the main shaft or other driven part of an engine or other machine; second, the combination of such a speed-indicator with a suitable recording device whereby the speed or number of revolutions in a given time may be permanently recorded or with a suitable cyclometer whereby the total number of revolutions, &c., may be shown, or with both such recording device and such cyclometer.

The invention consists in the novel features, mechanisms, and parts, and combinations thereof hereinafter described, and particularly pointed out in the claims.

My invention is practically embodied in the hereinafter-described mechanism, illustrated by the accompanying drawings, in which—

Figure 1 is a side elevation of my speed-indicator, showing the inclosing case, the dial whereby the speed made during the elapsed period of time is shown until a like succeeding period has passed, a clock dial and hands, a speed-recording device, and a cyclometer. Fig. 2 is a view, on a larger scale, of the same with the front of the inclosing case, the speed-indicating dial, and part of the clock-dial removed to show the operating mechanism within the case. Fig. 3 is an enlarged detail view of the mechanism and electrical means whereby the speed-indicator is operated, &c. Fig. 4 is a detail view showing a horizontal section of Fig. 3 on line 4 4 of Fig. 3 looking in the direction of the arrows shown at said line 4 4. Fig. 5 is a detail view of my improved electric-circuit breaker and closer for breaking and closing the current in the electric magnet which actuates the speed-indicator hand or pointer. Fig. 6 is a detail view showing a vertical section of Fig. 5 on line 6 6 of Fig. 5 looking in the direction of the arrows shown at said line 6 6. Fig. 7 is a detail view of a simpler form of said electric-circuit breaker and closer, and Fig. 8 is a detail view showing a vertical section of Fig. 7 on line 8 8 of Fig. 7 looking in the direction of the arrows shown at said line 8 8.

A suitable casing or frame A supports a stationary spindle or stud $a$, on which loosely rotate a ratchet-wheel B, a brake-wheel C, and a brake-wheel D, which carries the pointer $d'$. Each of these three wheels is pressed to rotate in the same direction and toward the zero position of the indicator-dial E by suitable means, as by the drum-inclosed spring $b$ pressing the wheel B, the drum-inclosed spring $c$ pressing the wheel C, and the helical spring $d$ pressing the wheel D, through the means of the lever-arm $f$ of the recording device, to which lever-arm is attached a suitable cord, wire, or chain $d^2$, wound on a drum $d^3$, carried by the wheel D. The pointer $d'$ is prevented from being turned by said springs back of the zero position on the dial E by a projecting part or lug $b'$ on the wheel B abutting against a fixed projection or lug $a'$ on the frame, a projecting part or lug $c'$ on the wheel C abutting against a projecting part or lug $b^2$ on the wheel B, and a projecting part or lug $d^4$ on the wheel D abutting against a projecting part or lug $c^2$ on the wheel C.

To indicate the speed of the vehicle or vessel or the number of revolutions, &c., of the machine to which the indicator is attached, the main shaft or other driven part of the vehicle, &c., turns the ratchet-wheel B by a spring-pressed click $g$, adapted to engage its teeth and pivoted on a lever-arm G, fulcrumed at $g'$ on the frame. This lever-arm may be operated by any suitable mechanical means, as by the rod $g^2$, which may communicate motion to it from any rotary, reciprocal, or other driven part of the machinery of the vehicle, &c., or by electrical means, as by the electric magnet H, operating on an armature $g^3$, attached to said lever-arm, the current in said magnet being made and broken by the movement of the machinery of the vehicle, &c., in any suitable manner, preferably by the means and in the manner hereinafter described. The ratchet-wheel is held against return movement by a suitable spring-pressed ratchet $b^3$, pivoted on the frame, and the click $g$ has preferably the spring-pressed keeper $a^2$, pivoted on the frame and adapted to turn on its pivot against the pressure of its spring by the motion of the click in advancing the ratchet-wheel, allowing the ratchet sufficient "play" and yet preventing it when the speed becomes great from jumping or skipping the teeth. A portion of the ratchet-wheel is left solid or unmilled in order that it may not be turned far enough for the lug $b'$ to be forced by the action of the click against the lug $a'$ on the frame. For the purpose hereinafter stated the wheels B, C, and D are at intervals released from the action of said click and ratchet and are allowed to turn under the pressure of their springs by suitable clock-controlled means, preferably the following: The current energizing the electric magnet I is closed and broken by means of a clock of any suitable construction, which may have the hands J and $j$ and the clock-dial $j'$. The seconds-hand shaft carries a cam-wheel $j^2$, turning in the direction indicated by the arrow thereon and having one or more projections similar to the teeth of a ratchet-wheel. These are four in number in the construction shown in the drawings and are spaced to correspond to intervals of fifteen seconds apart. An electric-circuit closer and breaker comprising two lever-arms K and $k$ closes the circuit through the magnet I by the contact of the points $k'$ $k^2$ when in the revolution of the cam-wheel the end $k^3$ of the lever-arm $k$ drops from one of said projections and before the end $k^4$ of the other lever-arm K (which is slightly longer than the lever-arm $k$) has fallen from said projection. Thus every fifteen seconds in the construction shown in the drawings the circuit is closed for a very short time. The magnet I when energized attracts the armature $i$, attached to the lever L, fulcrumed at $l$ on the frame. Loosely fulcrumed also at $l$ is the bell-crank lever M, having on one arm a brake-shoe $m$, adapted to press on the periphery of the wheel C and hold it against the action of its spring until the brake is released by the pin $l'$ striking the other arm $m'$ of the bell-crank lever, when the magnet I is deënergized. The bell-crank lever N, fulcrumed at $n$ on the frame, has on one arm a brake-shoe $n'$, adapted to press on the periphery of the wheel D and hold it against the action of its spring until the brake is released by the pin $l^2$ striking the arm $n^2$ of the bell-crank lever N, when the magnet I is energized. Pivoted to the third arm $n^3$ are two rods O and $o$, having slot-openings in which are adapted to move the pins $b^4$ and $b^5$ on the ratchet $b^3$ and the click $g$, respectively, when said ratchet and click are engaging the teeth of the ratchet-wheel B, the magnet I being deënergized; but when the pin $l^2$ strikes the arm $n^2$, said magnet being energized, the arm $n^3$, acting on said rods and pins $b^4$ and $b^5$, presses the ratchet and the click away from and out of engagement with the teeth of the ratchet-wheel. A suitable spring P presses the arms $m'$ and $n^2$ apart. When the pointer $d'$ is at the zero position on the dial E and the vehicle, &c., to which the indicator is attached is not in motion, the electric connection with the magnet I may be automatically broken by suitable means, preferably a pin $d^5$ on the wheel D striking one end, $q'$, of the switch Q, pivoted on the frame, the other end, $q$, of said switch through which electric contact is made with the contact-point $a^3$ being thus forced away from said contact-point $a^3$; but when the vehicle, machine, &c., begins to move and the pointer to turn the pin $d^5$ releases the end $q'$ of the switch Q and the contact-point $q$ by the force of gravity or by suitable spring-pressure makes contact with the point $a^3$.

When the motion of the vehicle, vessel, or machine is communicated to the speed-indicator by electric means, a circuit breaker and closer for the magnet H of the construction shown in Figs. 5 and 6 or Figs. 7 and 8 is preferable. A projecting part or pin $r$, carried by a crank or, as shown in the drawings, by a wheel R, which is revolved on a stud or spindle $r^2$ by a moving part of the vehicle, machine, &c., is adapted to abut against a crank-like arm $r'$, loosely rotating on said stud or spindle, and thus rotate it. In the construction shown in Figs. 5 and 6 this crank-like arm has a pin $r^3$, which passes through a slot-opening in a crank-like plate or sector $r^4$, loosely rotating on said stud or spindle, and thus rotates it. This crank-like plate or sector has on its periphery a slight elevation $r^5$ or rib, on which in the revolution of the crank-plate $r^4$ travels the end of the lever-arm S of an electric switch furnished, preferably, with a friction-roller $s$. The elevation $r^5$ in the revolution of the crank-plate $r^4$ raises the lever-arm until it makes electric contact with the contact-spring $s'$, whereby the circuit to the magnet H is closed. The moment the elevation $r^5$ passes the lever-arm S or its wheel $s$ the electric connection is instantly broken by the action of the spring $s^2$, attached to the pin $r^3$ and pressing it toward the fixed point $s^3$ of said spring, as more fully explained hereinafter. The crank or wheel R may revolve in either direction, and the operation will be the same. A simpler form of this device adapted to the revolution of the crank or wheel R in but one direction is shown in Figs. 7 and 8, the crank-like arm $r'$ being omitted, the crank-plate or sector $r^4$ having no slot, the spring $s^2$ being attached to the pin $s^4$ on the crank-plate or sector $r^4$, and the circuit may be closed by the contact of the point $r^5$ with the contact-spring or lever S, as will be readily understood by reference to Figs. 7 and 8. It will be understood that whether the rotation of the crank-plate or sector $r^4$ is fast or slow the electric connection is always broken instantly it is closed, because as soon as the sector $r^4$ is rotated far enough for the pin $r^3$ in Figs. 5 and 6 or the pin $r^4$ in Figs. 7 and 8 to pass its "dead-center"—that is, to pass a line produced upward from the fixed point $s^3$ of the spring $s^2$ through the center of the spindle $r^2$—the spring $s^2$ instantly acts on the sector $r^4$, rotating it forward, so that the projection $r^5$ is by the action of the spring forced into contact with the lever-arm or spring S and instantly out of contact therewith, whereby the circuit is by the force of the spring $s^2$ broken instantly it is closed.

Preferably a cyclometer T of any suitable construction for indicating the total number of revolutions, &c., of the machinery to which the indicator is applied may be operated by my speed-indicator by suitable means, as by the ratchet $g^4$, pivoted on the lever G and adapted to actuate the ratchet-wheel $g^5$ of the cyclometer, and a suitable recording device for permanently recording the speed, &c., of the machine, &c., may be applied to the clockwork of my speed-indicator in any suitable way, as by attaching to the spindle carrying the clock hour-hand a paper circle U, suitably spaced and ruled, on which a pencil $u$, carried by a lever-arm $u'$, attached to and moved by the lever-arm $f$, will trace a line permanently indicating the speed or number of revolutions made by the machine, &c., for every hour during the twelve.

It will be understood that the magnet H and the circuit breaker and closer illustrated in Figs. 5 and 6 or 7 and 8, controlled by the vehicle, &c., are arranged in one circuit, the wires X $x$ leading to said circuit breaker and closer and the wires Y $y$ to the source of electric energy, while the magnet I, with its clock-controlled circuit closer and breaker K $k$, the wires Z $z$ leading to the source of electric energy, are arranged in another, although both circuits may be supplied from the same source of energy.

Certain adjusting devices, as shown in the drawings, are preferably used. The indicator hand or pointer $d'$ has an adjusting set-screw, as is clearly shown in Figs. 2 and 3. The lever-arm $u'$ is adjustably secured to the lever-arm $f$ by a set-screw, as clearly shown in Fig. 2, and the length of the contact of the points $k'$ and $k^2$ may be regulated by pivoting one of the levers K or $k$ on a lever-arm W, pivoted on the frame, so that, as shown in Fig. 2, by slightly turning the lever-arm W (adjustable by the set-screw $w$) the length of time between the falling of the lever $k$ and the lever K from one of the projections of the cam-wheel $j^2$ may be increased or diminished.

The means for showing the speed, comprising in the construction described the pointer and dial E, may be designated as an "indicating device." The means for turning or advancing the pointer, comprising in the construction shown the wheels B, C, and D and the means whereby they are turned against the pressure of their springs, may be called "an advancing mechanism for the indicating device," and the means whereby this advancing mechanism is held against return movement, comprising in the construction shown the brake-shoes, &c., together with the clock-controlled means whereby said mechanism is periodically released and allowed to return, may be denominated "a holding and releasing device for the advancing mechanism," &c.

The operation of my speed-indicator is as follows: When the vehicle, vessel, or machine to which the speed-indicator is applied begins to move, the magnet I being deënergized and the brake-shoe $n'$ pressing the wheel D, the click $g$ turns the ratchet-wheel B, which by the lugs $b^2$ and $c'$ turns the brake-wheel C, which by the lugs $c^2$ and $d^4$ turns the brake-wheel D, thus advancing the pointer $d'$. At the termination of the period of fifteen seconds the end $k^3$ of the lever $k$ falls from the projection on the cam-wheel $j^2$. The circuit to the magnet I is thus closed, the connection between the contact-points $q$ and $a^3$ having been previously made by the lug $d^5$ of the wheel D releasing the end $q'$ of the switch Q. The armature $i$ on the lever L being attracted, the pin $l'$ moves out of contact with the arm $m'$ of the bell-crank lever M and the spring P presses the brake-shoe $m$ (which had previously been held out of contact with its wheel C) into contact with it, thus preventing it from being returned by the pressure of its spring $c$. The pin $l^2$ is placed in such position on the lever L that immediately after the wheel C is thus pressed by its brake $m$, the armature $i$ being further attracted by the magnet I, said pin $l^2$ strikes the arm $n^2$ of the bell-crank lever N, thus releasing the brake-shoe $n'$ from contact with the wheel D and also releases the ratchet $b^3$ and the click $g$ from the teeth of the ratchet-wheel B, which then under the pressure of its spring turns back till its lug $b'$ is stopped by the projection $a'$ on the frame. Then the end $k^4$ of the lever K falls from the same projection of the cam-wheel $j^2$, and the circuit through the magnet I being thus broken the armature $i$ on the lever L is pressed away from the magnet I by the spring P, the pin $l^2$ thus moving away from and releasing the arm $n^2$, whereby the brake-shoe $n'$ then presses by the action of the spring P on the wheel D and holds it against the action of its spring $d$. At the same time the click $g$ and the ratchet $b^3$ again come into engagement with the teeth of the ratchet-wheel B. Immediately after this the armature $i$ being further pressed by the spring P away from the magnet I the pin $l'$ strikes the arm $m'$ of the bell-crank lever M, whereby the brake-shoe $m$ is released from the wheel C, which under the action of its spring $c$ turns back until its lug $c'$ strikes the lug $b^2$ on the ratchet-wheel, the wheel D, however, being held by its brake $n'$, so that the pointer $d'$ indicates on the dial E the speed or number of revolutions made during the elapsed fifteen seconds. The vehicle, machine, &c., to which the speed-indicator is applied continuing to move the operation is repeated. If the speed is greater during this period of fifteen seconds than during the like period just elapsed, the lug $c^2$ of the wheel C will reach the lug $d^4$ of the wheel D and carry it and the pointer $d'$ farther, thus indicating on the dial E a greater number of miles, &c., or revolutions at the end of this quarter-minute than was indicated at the end of the last. If, however, the speed is not so great as during the last fifteen seconds, the lug $c^2$ of the wheel C will not reach the lug $d^4$ of the wheel D at the end of the quarter-minute period, so that when its brake $n'$ is released the wheel D will under the action of its spring $d$ turn back until the lug $d^4$ is arrested by the lug $c^2$ and the pointer $d'$ will indicate on its dial the lessened speed or number of revolutions.

It will be understood that the pressure of the brake-shoes is sufficient to prevent the wheels to which they are applied from turning back under the action of their springs, but not sufficient to prevent these wheels from being turned forward by the action of the "advancing mechanism."

The circuit closer and breaker described herein, and illustrated in Figs. 5, 6, 7, and 8, is divided from this application and made the subject-matter of my divisional application Serial No. 137,445, series of 1900, and the regulating device of the clock-controlled circuit closer and breaker comprising the levers K $k$, &c., operated by the cam-wheel $j^2$, is divided from this application and made the subject-matter of my divisional application Serial No. 137,790, series of 1900.

I do not limit myself to the particular construction above described further than as pointed out in the claims.

Having thus fully described my invention, I claim as new and desire to secure by Letters Patent—

1. A speed-indicator actuated from the machine in connection with which the indicator is employed, comprising an indicating device; an advancing mechanism for said indicating device comprising a movable part actuated by said machine, a second movable part actuated by said first movable part, and a third movable part actuated by said second movable part; a holding device for holding each of said movable parts against return movement; and a periodically-controlled releasing device for periodically releasing said movable parts from said holding device, substantially as and for the purpose described.

2. A speed-indicator actuated from the machine in connection with which the indicator is employed, comprising an indicating device; an advancing mechanism for said indicating device comprising a wheel rotated by said machine, a second wheel rotated by the revolution of said first wheel, and a third wheel rotated by the revolution of said second wheel; a holding device for holding each of said wheels against return movement; and a clock-controlled electrical releasing device for periodically releasing said three wheels from said holding device, substantially as and for the purpose described.

3. A speed-indicator actuated from the machine in connection with which the indicator is employed, comprising an indicating device; an advancing mechanism for said indicating device comprising a movable part actuated by said machine by electrical means, a second movable part actuated by said first movable part, a third movable part actuated by said second movable part; a holding device for holding each of said movable parts against return movement; and a clock-controlled electrical releasing device for periodically releasing said three movable parts from said holding device, substantially as and for the purpose described.

4. A speed-indicator actuated from the machine in connection with which the indicator is employed, comprising a spring-pressed ratchet-wheel, a click actuated by said machine and adapted to rotate said ratchet-wheel, means for holding said ratchet-wheel against return movement, a spring-pressed brake-wheel, a lug on the ratchet-wheel adapted to engage a lug on the brake-wheel and rotate the brake-wheel with the ratchet-wheel, a second spring-pressed brake-wheel carrying an indicator-hand, a lug on the first brake-wheel adapted to engage a lug on the second brake-wheel and rotate the second with the first brake-wheel, brake-shoes adapted to hold said brake-wheels against return movement, and a clock-controlled electric releasing device for periodically releasing the said wheels and allowing them to return by the pressure of their springs, substantially as and for the purpose described.

5. A speed-indicator actuated from the machine in connection with which the indicator is employed, comprising a spring-pressed ratchet-wheel, a lever oscillated by said machine by electrical means, a click carried by said lever and adapted to rotate said ratchet-wheel, means for holding the ratchet-wheel against return movement, a spring-pressed brake-wheel, a lug on the ratchet-wheel adapted to engage a lug on the brake-wheel and rotate the brake-wheel with the ratchet-wheel, a second spring-pressed brake-wheel carrying an indicator-hand, a lug on the first brake-wheel adapted to engage a lug on the second brake-wheel and rotate the second with the first brake-wheel, brake-shoes adapted to hold said brake-wheels against return movement, and a clock-controlled electric releasing device for periodically releasing the said wheels and allowing them to return under the pressure of their springs, substantially as and for the purpose described.

6. In a speed-indicator having a wheel rotated by the machine to which the indicator is applied, and a second wheel rotated by said first wheel, and a third wheel rotated by said second wheel, a holding and releasing device for said wheels comprising a lever L having the projections $l'$ and $l^2$, a bell-crank lever M having the arm $m'$ and a suitable holding device for holding the second wheel against return movement, the bell-crank lever N having the arm $n^2$ and a suitable holding device for holding the third wheel against return movement and also having means whereby the first wheel is released from its holding device at the same time the third wheel is released, a suitable holding device for holding the first wheel against return movement, and clock-controlled means for periodically oscillating said lever L substantially as and for the purpose described.

7. A speed-indicator comprising an indicating device; an advancing mechanism for said indicating device comprising a wheel rotated by the machine to which the indicator is applied, a second wheel rotated by said first wheel, and a third wheel rotated by said second wheel; a holding and releasing device for said wheels comprising an armature-lever L having the projections $l'$ and $l^2$, a bell-crank lever M having the arm $m'$ and a brake $m$ for holding the second wheel against return movement, the bell-crank lever N having an arm $n^2$ and a holding-brake $n'$ for holding the third wheel against return movement, a holding device for holding the first wheel against return movement, means for releasing the first wheel by the motion of the bell-crank lever N, a spring P, an electric magnet arranged to actuate the armature-lever L, and a clock-controlled circuit closer and breaker for periodically closing and breaking the current to said magnet, substantially as and for the purpose described.

8. A speed-indicator comprising an indicating device; an advancing mechanism for said indicating device comprising a spring-pressed ratchet-wheel a portion of whose periphery is untoothed, a click actuated by the machine to which the indicator is applied and adapted to rotate said ratchet-wheel, a spring-pressed keeper $a^2$ pivoted on the frame of the speed-indicator and adapted to prevent the click from skipping the teeth, a ratchet for holding the ratchet-wheel against return movement, a spring-pressed brake-wheel, a lug on the ratchet-wheel adapted to engage a lug on the brake-wheel and rotate the brake-wheel with the ratchet-wheel, a second spring-pressed brake-wheel carrying an indicator-hand, a lug on the first brake-wheel adapted to engage a lug on the second brake-wheel and rotate the second with the first brake-wheel; a holding and releasing device for said wheels comprising an armature-lever L having projections $l'$ and $l^2$, a bell-crank lever M having an arm $m'$ and a brake-shoe $m$ for holding the first brake-wheel against return movement, the bell-crank lever N having an arm $n^2$ and a brake-shoe $n'$ for holding the second brake-wheel against return movement, the rods O and $o$ for disengaging the ratchet and the click from the teeth of the ratchet-wheel by the action of the bell-crank lever N, a spring P, an electric magnet to actuate the armature-lever L, and a clock-controlled circuit closer and breaker for periodically closing and and breaking the circuit to the magnet, substantially as and for the purpose described.

9. A speed-indicator comprising a frame; an indicating device; an advancing mechanism for said indicating device actuated by an electric magnet on said frame; an electric circuit containing said magnet; a circuit closer and breaker in said circuit controlled by a movable part of the machine to which the indicator is applied; a holding and releasing device for said advancing mechanism actuated by another electric magnet on said frame; an electric circuit containing said second magnet; a clock-controlled circuit closer and breaker in the last-mentioned circuit for periodically energizing and deënergizing said second magnet, substantially as and for the purpose described.

10. In a speed-indicator, an indicating device; an advancing mechanism for the indicating device; an electrically-controlled holding and releasing device for the advancing mechanism; and a circuit-breaker in the circuit by which the holding and releasing device is controlled for automatically breaking said circuit when the indicator is at the zero position, said circuit-breaker comprising a lever-arm pivoted on the frame and bearing one electric contact-point, together with a striker carried by the advancing mechanism and placed in such position thereon as to impinge on said lever-arm to hold its contact-point away from the other contact-point to break said circuit when the indicator is at the zero position.

11. A speed-indicator actuated from the machine in connection with which the indicator is employed, comprising an indicating device; an advancing mechanism for said indicating device comprising a movable part actuated by said machine against the pressure of a spring, a second movable part actuated by said first movable part against the pressure of a spring, and a third movable part actuated by said second movable part against the pressure of a spring; a holding device for holding each of said movable parts against return movement; and a periodically-controlled releasing device for periodically releasing said movable parts from said holding device.

12. A speed-indicator actuated from the machine in connection with which the indicator is employed, comprising an indicating device; an advancing mechanism for said indicating device comprising a wheel rotated by said machine against the pressure of a spring, a second wheel rotated against the pressure of a spring by the rotation of the first wheel, and a third wheel rotated against the pressure of a spring by the revolution of the second wheel; a holding device for holding each of said wheels against return movement; and a clock-controlled releasing device for periodically releasing said three wheels from said holding device.

13. A speed-indicator actuated from the machine in connection with which the indicator is employed, comprising an indicating device; an advancing mechanism for said indicating device comprising a movable part actuated by said machine against the pressure of a spring by electrical means, a second movable part actuated by said first movable part against the pressure of a spring, and a third movable part actuated by said second movable part against the pressure of a spring; a holding device for holding each of said movable parts against return movement; and a clock-controlled releasing device for periodically releasing said three movable parts from said holding device.

14. A speed-indicator actuated from the machine in connection with which the indicator is employed, comprising an indicating device; an advancing mechanism for said indicating device comprising a movable part actuated by said machine, a second movable part actuated by said first movable part, and a third movable part actuated by said second movable part; and a holding and periodically-controlled releasing device for holding each of said movable parts against return movement and periodically releasing the same and adapted to hold the second movable part against return movement while releasing the first and third movable parts.

15. A speed-indicator actuated from the machine in connection with which the indicator is employed, comprising an indicating device; an advancing mechanism for said indicating device comprising a wheel rotated by said machine against the pressure of a spring, a second wheel rotated against the pressure of a spring by the revolution of said first wheel, and a third wheel rotated against the pressure of a spring by the revolution of said second wheel; and a clock-controlled holding and releasing device for holding each of said wheels against return movement and periodically releasing the same, and adapted to hold the second wheel against return movement while releasing the first and third wheels.

16. A speed-indicator actuated from the machine in connection with which the indicator is employed, comprising an indicating device; an advancing mechanism for said indicating device comprising a movable part actuated by said machine by electrical means, a second movable part actuated by said first movable part, and a third movable part actuated by said second movable part; and a clock-controlled holding and releasing device for holding each of said movable parts against return movement and periodically releasing the same, and adapted to hold the second movable part against return movement while releasing the first and third movable parts.

17. In a speed-indicator, having an electrically-controlled holding and releasing device for the advancing mechanism, an automatic circuit-breaker in the circuit containing said holding and releasing device for breaking said circuit when the indicator is at the zero position, and for closing said circuit when the indicator is advanced from the zero position, said circuit-breaker comprising a lever-arm turning on a pivot and bearing one electric contact-point, together with a striker carried by the advancing mechanism and placed in such position thereon as to impinge on said lever-arm to hold its contact-point away from the other contact-point when the indicator is at the zero position, and to release said lever-arm to allow the contact-points to connect when the indicator has advanced from the zero position.

18. A speed-indicator comprising an indicating device; an advancing mechanism for said indicating device comprising a wheel rotated by the machine to which the indicator is applied, a second wheel rotated by the first wheel, and a third wheel rotated by the second wheel; a holding and releasing device for said wheels comprising an armature-lever L having projections $l^2$ and $l^3$, a bell-crank lever M having the arm $m'$ and a brake $m$ for holding the second wheel against return movement, the bell-crank lever N having an arm $n^2$ and a holding-brake $n'$ for holding the third wheel against return movement, a holding device for holding the first wheel against return movement, means for releasing the first wheel by the motion of the bell-crank lever N, a spring P, an electric magnet arranged to actuate the armature-lever L; a clock-controlled circuit closer and breaker for periodically closing and breaking the circuit to said magnet; and a circuit-breaker in said circuit comprising a lever Q, contact-points $q$ and $a^3$ and a striker carried by the advancing mechanism and placed in such position thereon as to press on the lever when the indicator is at the zero position to separate the contact-points.

19. A speed-indicator actuated from the machine in connection with which the indicator is employed, comprising an indicating device; an advancing mechanism for said indicating device comprising a movable part actuated by said machine against the pressure of a spring, a second movable part actuated by said first movable part against the pressure of a spring, and a third movable part actuated by said second movable part against the pressure of a spring; a holding device for holding each of said movable parts against return movement; a periodically-controlled releasing device for periodically releasing said movable parts from said holding device; a cyclometer; and means for actuating the cyclometer from the advancing mechanism.

20. A speed-indicator actuated from the machine in connection with which the indicator is employed, comprising an indicating device; an advancing mechanism for said indicating device comprising a movable part actuated by said machine against the pressure of a spring, a second movable part actuated by said first movable part against the pressure of a spring, and a third movable part actuated by said second movable part against the pressure of a spring; a holding device for holding each of said movable parts against return movement; a periodically-controlled releasing device for periodically releasing said movable parts from said holding device; a recording device for recording the speed; and means for actuating said recording device from the advancing mechanism.

21. A speed-indicator actuated from the machine in connection with which the indicator is employed, comprising an indicating device; an advancing mechanism for said indicating device comprising a movable part actuated by said machine against the pressure of a spring, a second movable part actuated by the said first movable part against the pressure of a spring, and a third movable part actuated by said second movable part against the pressure of a spring; a holding device for holding each of said movable parts against return movement; a periodically-controlled releasing device for periodically releasing said movable parts from said holding device; a cyclometer; a recording device for recording the speed; and means for actuating said cyclometer and said recording device from the advancing mechanism.

In testimony whereof I have signed my name to this specification in the presence of two subscribing witnesses.

THOMAS H. McQUOWN.

Witnesses:
A. P. McHenry,
John Y. Whiteman.